United States Patent [19]

Lewison

[11] Patent Number: 4,461,358
[45] Date of Patent: Jul. 24, 1984

[54] LEAF SPRING SHANK ASSEMBLY

[75] Inventor: Howard L. Lewison, Hutchinson, Minn.

[73] Assignee: Dynamics Corporation of America, Greenwich, Conn.

[21] Appl. No.: 378,883

[22] Filed: May 17, 1982

[51] Int. Cl.³ .............................................. A01B 61/04
[52] U.S. Cl. ..................................... 172/705; 172/763
[58] Field of Search ................... 267/36 R, 41, 48, 28; 172/705, 711, 708, 763, 264, 265, 707, 643

[56] References Cited

U.S. PATENT DOCUMENTS

| 264,360 | 9/1882 | Stanton | 172/707 |
|---|---|---|---|
| 1,012,086 | 12/1911 | Kimmons | 172/708 X |
| 2,906,353 | 9/1959 | Rogers | 172/265 |
| 3,425,755 | 2/1969 | Harris | 172/763 |
| 3,480,086 | 12/1969 | Groenke | 172/710 |
| 3,700,038 | 10/1972 | Essex | 172/265 |
| 3,700,039 | 10/1972 | Essex et al. | 172/265 |
| 3,981,367 | 9/1976 | Mydels | 172/265 |
| 4,011,915 | 3/1977 | Anderson | 172/705 |
| 4,143,718 | 3/1979 | Quanbeck | 172/705 |
| 4,177,865 | 12/1979 | Lewison | 172/705 |
| 4,261,423 | 4/1981 | Williamson | 172/705 |
| 4,281,719 | 7/1981 | Hake et al. | 172/710 |
| 4,312,409 | 1/1982 | Mills | 172/572 |

FOREIGN PATENT DOCUMENTS

| 11012 | 12/1927 | Australia | 172/708 |
|---|---|---|---|
| 306612 | 7/1918 | Fed. Rep. of Germany | 172/707 |

Primary Examiner—Richard J. Johnson
Attorney, Agent, or Firm—Schroeder, Siegfried, Vidas & Arrett

[57] ABSTRACT

A one-piece shank assembly is disclosed which is comprised of a flat leaf spring having an arcuate intermediate portion, a lower end portion adapted to mount a ground working tool, and an upper end portion which is reversed upon itself to thereby form a pivot sleeve at the forward end of the shank. The leaf spring is brought rearwardly in contiguous and overlying relation to the intermediate portion and its terminal portion is then again reversed upon itself upwardly, forwardly, and then downwardly to form a sleeve bearing for the lower end of a pressure rod. Also disclosed is a simplified mounting assembly for the shank comprised of a pair of rearwardly facing and pivotally connected U-shaped channel members, portions of which are cut away to receive and clamp the frame bar of a ground-working machine in an effective and efficient manner.

15 Claims, 3 Drawing Figures

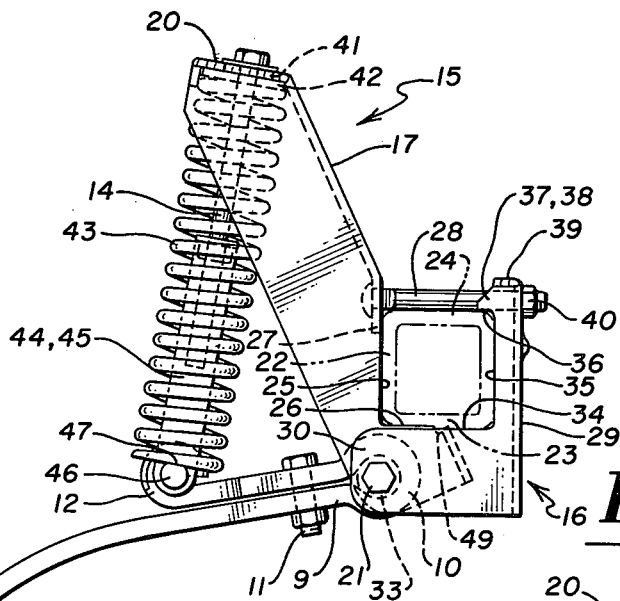
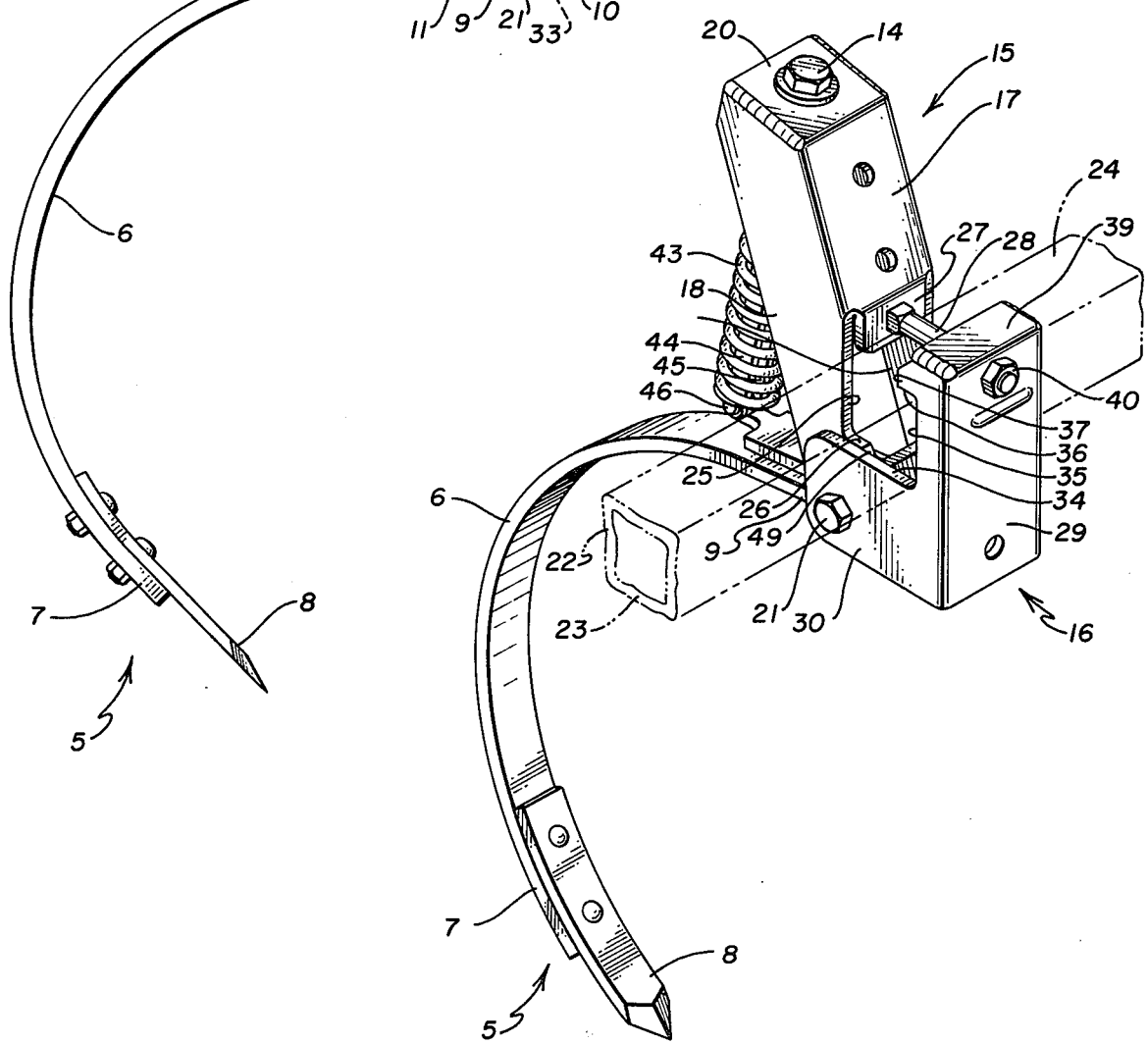

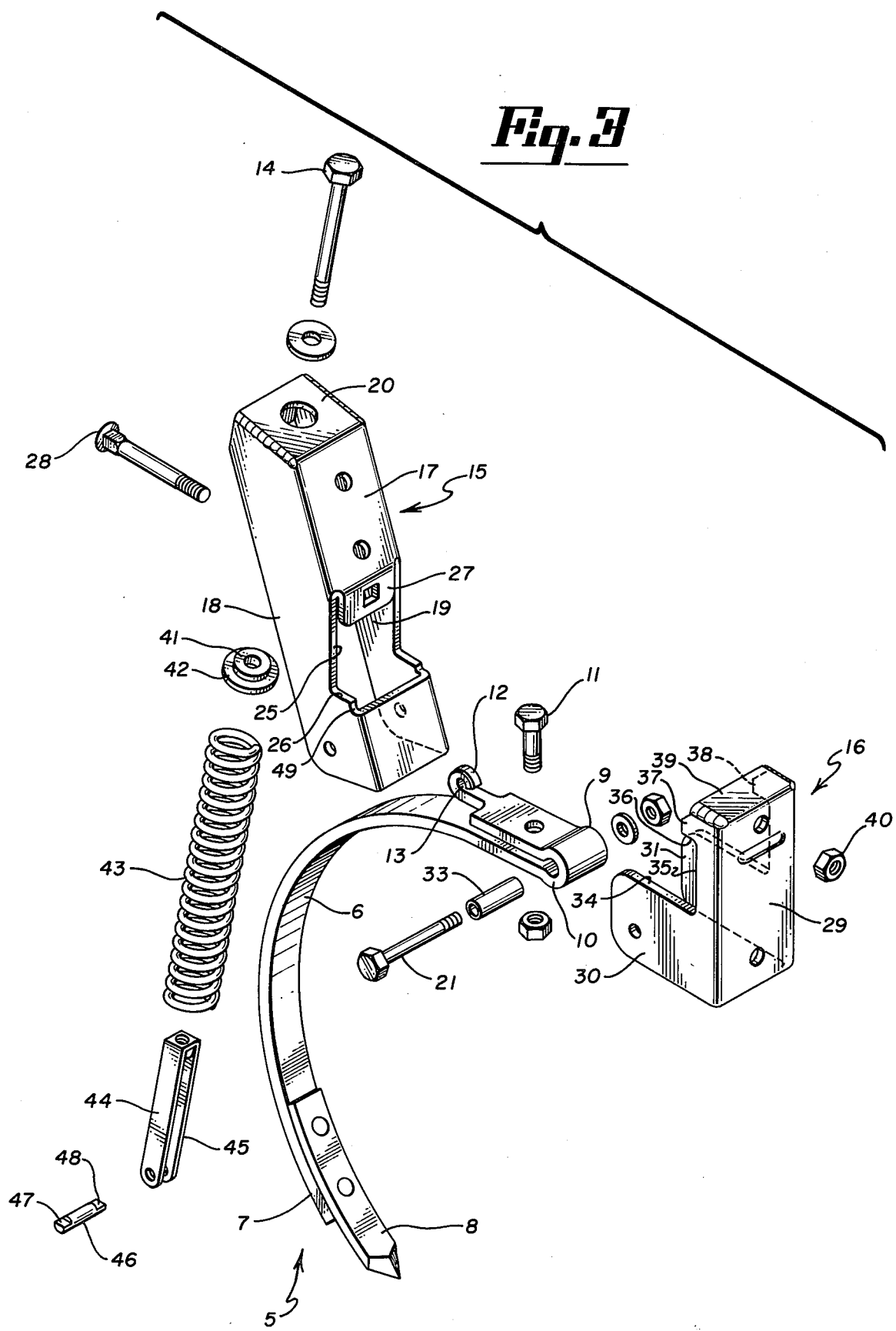

LEAF SPRING SHANK ASSEMBLY

DESCRIPTION

BACKGROUND OF PRIOR ART

The prior art is replete with multiple attempts to arrive at a satisfactory shank mounting assembly which is relatively inexpensive to manufacture and can be mounted quickly and easily. Pertinent examples of such attempts are disclosed in U.S. Pat. Nos. 2,906,353; 3,480,086; 3,981,367; 4,143,718; 4,177,865; 4,269,423; and 4,281,719. All of the prior art known to me, however, is inadequate, particularly with respect to either the cost of manufacturing the spring shank and/or the mounting therefor, the ease with which it may be assembled and mounted, or the amount of time required for same. Most, if not all, have difficulty with the spring loading not remaining aligned and with undue wear upon the upper end portion of the pressure rod and of the retaining member through which it reciprocates vertically. My invention is directed to the solution of these problems.

BRIEF SUMMARY OF THE INVENTION

My invention provides advantages over the prior art with respect to each of the above considerations. My shank assembly is much less expensive to manufacture and assemble, it reduces the number of required parts and the assembly time, and is much more simple to assemble and mount upon a ground-working machine.

I have accomplished the above by conceiving of manufacturing the shank and the means for pivotally mounting and pivotally connecting the same to the pressure rod, from a single leaf of spring steel alloy. This is accomplished by simply reversing such a shank upon itself to form a pivot sleeve at its forward end by bringing the same upwardly and rearwardly so as to extend along the upper surface of the leaf. By reversing the terminal portion of the overlying leaf upon itself upwardly, forwardly, and then downwardly, I provide a simple and inexpensive bearing for the pressure rod.

A further simplification of the mounting for such a shank is also provided by modifying a pair of rearwardly facing U-shaped channel members so that a single bolt, when tightened, will securely mount the shank assembly upon a transverse frame bar. This is accomplished by simply cutting away portions of the legs of each channel member and utilizing a portion of the base of the channel member which carries the pressure rod as an anchor for the single bolt which extends forwardly through the base of the clamping channel members. A portion of the base, which originally supported a section of the leg elements which are cut away, is bent inwardly to bear against the rear surface of the frame bar and thereby provide such an anchor for said securing bolt.

BRIEF DESCRIPTION OF THE DRAWINGS

A detailed description of one preferred embodiment of the Leaf Spring Shank Assembly is hereafter described with specific reference being made to the drawings, in which:

FIG. 1 is a side elevation of the preferred embodiment of my invention with the transverse frame bar of the ground-working machine shown in section;

FIG. 2 is a perspective view thereof; and

FIG. 3 is an exploded view thereof.

DETAILED DESCRIPTION OF THE INVENTION

As shown, I have provided a leaf spring shank 5 which has a curved intermediate portion 6 and a lower forwardly extending end portion 7 adapted to have a ground-working tool 8 mounted thereon. The upper and forwardly extending end portion 9 is reversed upon itself upwardly and rearwardly at a point forward of said intermediate portion 6 to form an integral pivot sleeve 10. As shown in FIG. 1, the end portion 9 extends rearwardly along the upper surface of intermediate portion 9 in contiguous overlying relation and is secured thereto by a bolt 11 which extends therethrough.

The terminal portion 12 of said end portion 9 is further reversed upon itself upwardly and forwardly and then downwardly to form a sleeve bearing 13 for pressure rod 14. It can be seen by reference to FIG. 2 that this terminal portion 12 is reduced in width. By so constructing the shank member, it is possible to greatly reduce the cost thereof and to reduce the number of parts required to connect the shank to its pivotal mounting and associated pressure rod.

My shank mounting is comprised of a pair of rearward facing U-shaped channel members 15 and 16. The channel member 15 includes a base element 17 supporting a pair of spaced parallel rearwardly extending leg elements 18 and 19, the upper ends of which are connected by a pressure plate 20. The lower rear corner portions of each of said legs 18 and 19 have juxtapositioned transverse openings formed therethrough to accommodate a pivot pin or bolt 21 which pivotally mounts shank 5 thereupon by extending through said openings and through pivot sleeve 10 thereof.

The front side of the channel member 15 is cut away to provide a right angled area into which the rearward 22 and under-side surface 23 of a rectangular frame bar 24 may be received. The cuts are made in legs 18 and 19 along a vertical line 25 and a horizontal line 26 to form the necessary right angled notch so that it will conform to the shape of the frame bar 24.

A portion 27 of the section of the base element 17 which supported the cut-away areas of the legs 18 and 19 prior to the making of the cut is bent rearwardly to a position just inwardly of and parallel to line 25 so as to bear against the upper portion of the rear surface 22 of the frame bar, as shown in FIG. 1, and become an anchor element for anchor or carriage bolt 28.

The rearward facing clamping channel member 16 is L-shaped, as best shown in FIG. 2, when viewed from the side and has a vertically extending base 29 and a pair of legs 30, 31 extending rearwardly therefrom. Each of said legs has a juxtapositioned opening in its lower rear corner through which pivot pin 21 extends to pivotally mount shank 5 thereupon, pin 21 extending through pivot sleeve 10 and bushing 33 therewithin and also through the openings in the legs of channel member 15. The upper portions of legs 30 and 31 are each cut away along horizontal line 34 and vertical line 35 and upwardly spaced horizontal line 36, to define a right angled socket having the same dimensions as frame bar 24 so that the forward, top and bottom surfaces thereof may be received snugly therein. Only the oppositely disposed rearwardly extending ears 37 and 38 are permitted to remain, the balance of the upper portions of the legs 30, 31 being cut away. A strengthening plate 39 extends between the remaining portions of said legs at their upper ends.

As shown, an opening is provided in the upper end portion of base 29 to receive the forward end of carriage bolt 28 therethrough. Upon tightening of nut 40, frame bar 24 is tightly clamped between channel members 15 and 16 to securely pivotally mounted shank 5 and tool 8 thereupon for vertical swinging movement relative thereto.

Pressure plate 20 has a centrally disposed vertical opening through which the upper end portion of pressure rod 14 slidably extends. A tubular member 41, which is made of a self-lubricating plastic material such as Nylon, surrounds the rod 14 and is held within the opening of plate 20 by an integrally formed disc 42 connected to its lower end and bearing against the underside of plate 20. Disc 42 and tube 41 are held in place by compression spring 43 which bears against disc 42 and urges it upwardly.

The lower end portion of rod 14 is bifurcated to provide a pair of spaced elongated pivot ears 44 and 45 which extend downwardly over sleeve bearing 13 and have oppositely positioned openings to accommodate pivot pin 46 which extends therethrough and through bearing 13 to pivotally connect rod 14 to shank 5. The width of pivot ears 44 and 45 is such as to bear against the interior surfaces of the coils of spring 43 to maintain the latter in aligned relation.

The pivot pin 46 serves as a retainer pin for spring 43 and for that purpose has one side surface 47, 48 flattened at each of its ends. The spring 43 bears against these flattened surfaces to effectively lock the pin 46 in place and prevent its rolling or escape. More importantly, however, the flattened surfaces 47, 48 prevent the spring 43 from shifting radially and/or tilting. Thus, spring 43 is thereby maintained in aligned relation to pressure rod 14.

Mounting my assembly upon frame bar 24 is a simple and easy task which requires a minimum amount of time and effort. Upon removing nut 40 from carriage bolt 27, bracket 16 can be swung forwardly and downwardly, whereupon bracket 15 may be applied to the rear and under-side surfaces of bar 24. To facilitate same, the forward portions of the legs 18, 19 of bracket 15 and the portion of the base 17 adjacent the open area of bracket 15 are relieved slightly as at 49. Bracket 16 is then swung upwardly to the position shown in FIGS. 1 and 2, and carriage bolt 28 and nut 40 are tightened to quickly and effectively clamp frame bar 24 therebetween and securely and pivotally mount shank 5 thereupon.

The one-piece shank 5 has proved to be highly satisfactory and, of course, is much less expensive to manufacture and assemble than the many parts utilized previously by others. Moreover, a great deal less time and effort is required to mount the same, in view of the simplified and efficient twin channel members which I have designed. In addition, the pivot pin 46 effectively maintains spring 43 in alignment and tube 41 eliminates wear problems upon the portions of end plate 20 which define the opening through which rod 14 reciprocates. Varying field conditions cause shank 5 to rise and fall and spring 43 to be compressed or extended, depending upon the amount of resistance the ground provides to tool 8, to cause such reciprocation and otherwise cause wear of the opening defining portions of plate 20, with consequent misalignment of the pressure rod and its surrounding spring.

In considering this invention, it should be remembered that the present disclosure is illustrative only and the scope of the invention should be determined by the appended claims.

I claim:
1. A leaf spring shank assembly comprising:
(a) a leaf spring shank member having a curved intermediate portion and a forwardly and downwardly extending lower end portion constructed and arranged to have a ground-working tool secured thereto;
(b) the other and upper end portion of said shank member being reversed upwardly and rearwardly upon itself at a point forward of said intermediate portion and thereby defining a transverse pivotal mounting sleeve for said member and extending rearwardly from said sleeve above and in overlying relation along said intermediate portions of said shank member;
(c) the terminal portion of said other and upper end portion being reversed upon itself upward, forwardly and then downwardly and thereby defining a bearing sleeve for a compression spring guide;
(d) connector means located between said pivot sleeve and said bearing sleeve extending between said overlying and intermediate portions of said shank member and fixedly connecting the same in said overlying relation;
(e) an elongated ground-working machine transverse frame bar which is rectangular in cross-section;
(f) a rearward facing channel member pivotally supporting said shank mounting sleeve and said shank upon its lower portions;
(g) pressure rod means pivotally mounted on said bearing sleeve and extending upwardly through said channel member in piercing sliding relation;
(h) coiled compression spring means surrounding said pressure rod means and extending between said channel member and said terminal portion of said shank member and urging the latter downwardly;
(i) said channel member, when considered in cross-section having a base and a pair of leg elements extending rearwardly therefrom;
(j) said leg elements having juxtapositioned openings formed in their lower portions;
(k) said channel member having juxtapositioned essentially right-angled portions of its legs cut away at its lower front side and having the portion of its base defined by said cut-away portions of its legs also cut away to adapt said member to receive the rearward and under-side portions of said frame bar therewithin in conforming configuration;
(l) an L-shaped rearwardly facing channel member cooperatively clamping said first mentioned channel member to said frame bar and having a vertical base and rearwardly extending support legs with juxtapositioned transverse openings extending through the lower portions of said legs and being aligned with said openings in said first mentioned channel member;
(m) said clamping channel member having a pair of transversely spaced rearwardly extending ears at its upper end constructed and arranged to bear against an upper surface of said frame bar when the forward surface thereof is brought to bear within said clamping member;
(n) the juxtapositioned upper and rearward portions of said legs being cut away to define with said ears a right-angled cavity constructed and arranged to receive said frame bar therewithin in snug and conforming relation; and (o) threaded bolt means extending through said bases of said channel members immediately above said frame bar and drawing said members in close clamping relation thereto to effectively and pivotally mount said shank upon said frame bar.

2. The structure defined in claim 1, wherein (p) a portion of said base of said first mentioned channel member is cut free from its said cut-away portions of its legs and is bent rearwardly within its channel and depends parallel to and rearwardly of the vertical line along which said legs were cut away;

(q) said depending portion of said base extending downwardly along the rear surface of said frame bar and having an opening therein through which said bolt means extends;

(r) said depending portion of said base bearing against the rear surface of such frame bar and functioning as an anchor for said bolt means.

3. The structure defined in claim 1, and (p) a pressure plate extending between the upper end portions of said leg elements of said first mentioned channel member and having an opening extending vertically therethrough through which said pressure rod extends and slides.

4. The structure defined in claim 3, and (q) a tubular self-lubricating liner positioned and anchored within said opening of said pressure plate and surrounding said pressure rod.

5. The structure defined in claim 3, and (q) a tubular self-lubricating liner positioned within said opening of said pressure plate and surrounding said pressure rod;

(r) said liner having an integral flat annular disc connected to its lower end and positioned between the under-side of said pressure plate and the upper end of said spring means.

6. The structure defined in claim 1, and (p) said pressure rod means having a pair of spaced depending pivot ears having aligned transverse pivot pin openings and which extend downwardly over said bearing sleeve;

(q) a pivot pin extending through said pivot ears and said bearing sleeve and pivotally connecting the same; and (r) said pivot pin having a flattened upper surface at each of its ends upon which said spring means rests and which maintain said spring means in aligned relation with said pressure rod means.

7. The structure defined in claim 6, wherein (s) said flattened upper surfaces are relieved and said spring means bears thereagainst and extends downwardly beyond the medial non-relieved portions of said pivot pin.

8. A leaf spring shank assembly comprising a leaf spring shank member having a curved intermediate portion and a forwardly and downwardly extending lower end portion constructed and arranged to have a ground-working tool secured thereto, the other and upper end portion of said shank member being reversed upwardly and rearwardly upon itself at a point forward of said intermediate portion and thereby defining a transverse pivotal mounting sleeve for said member and extending rearwardly from said sleeve above and in overlying relation along said intermediate portions of said shank member for a substantial distance, the terminal portion of said other and upper end portion being reversed upon itself upwardly and forwardly and then downwardly and thereby defining a bearing sleeve for a compression spring guide, and connector means located between said pivot sleeve and said bearing sleeve and extending between said overlying and intermediate portions of said shank and fixedly connecting the same in said overlying relation.

9. The structure defined in claim 8 wherein said terminal portion is reduced in width with respect to said intermediate portion of said shank member.

10. The structure defined in claim 8 wherein said shank member is made of a steel alloy spring bar material.

11. The structure defined in claim 8 wherein said connector means includes a bolt extending through said overlying and intermediate portions of said shank member.

12. A mounting assembly for a spring shank for a ground-working tool to be mounted upon a rectangular in cross-section frame bar of a ground-working machine comprising:

(a) an upright elongated U-shaped channel member having a base and a pair of leg members extending rearwardly therefrom;

(b) each of said leg members having a juxtapositioned transverse opening formed through its lower rear corner portions;

(c) a pressure plate connected to the upper ends of said leg members and extending thereacross, said pressure plate having an opening therethrough constructed and arranged to telescopically mount a pressure rod therethrough;

(d) the forward portions of each of said leg members above and adjacent said openings therein having a juxtapositioned right angled section cut away along a vertical and horizontal line to adapt the same to receive the back-side and under-side of such a frame bar therein;

(e) the portions of said base of said channel member which extended between said cut-away portions of said legs being cut free of said cut away portions of said legs to accommodate such a frame bar within the right angled cut-away portions of said legs;

(f) a section of said portions of said base member cut free of said cut-away portions of said legs being bent rearwardly to extend downwardly parallel to and rearwardly of the vertical line of cut of said legs to constitute an anchor for a clamp member;

(g) said depending section of said base having an opening therethrough to receive a clamping bolt therethrough and anchor the same and extending downwardly therebeyond a distance sufficient to bear against the rearward surface of such frame bar;

(h) a second and separate U-shaped channel member having a base and a pair of legs extending rearwardly therefrom;

(i) each of said legs of said second-mentioned channel member having juxtaposed openings formed through its lower rear corner portions and being spaced from each other a distance sufficient to enable the lower end of said first channel member to be received therebetween;

(j) a pivot pin extending through said openings of said two channel members for pivotally mounting the forward end portion of a spring shank thereupon between the legs of said first-mentioned channel member;

(k) the rear and upper portions of said legs of said second channel member being cut away along horizontal and vertical lines to snugly receive the bottom and forward surfaces of such a frame bar therewithin;

(l) said base of said second channel member having an opening formed through its upper end portion opposite said opening in said depending section of the base of said first mentioned channel member; and (m) an anchor bolt extending through said openings in said bases of said channel members and anchoring the same to such a frame bar when tightened.

13. The structure claimed in claim 12 and a pair of rearwardly extending ears, one each of which is carried at the upper end of each of said legs of said second-mentioned channel member adjacent its base whereby such a frame bar may be more effectively clamped between said channel members.

14. The structure defined in claim 12 wherein said base, and portions of said legs immediately adjacent thereto, of said first-mentioned channel member are relieved additionally at the lower and forward edge of its said cut-away section to facilitate mounting of the assembly upon such a frame bar.

15. The structure defined in claim 12 and a plastic self-lubricating tubular liner anchored within said opening in said pressure plate and constructed and arranged to slidably receive such a pressure rod therethrough.

* * * * *

UNITED STATES PATENT AND TRADEMARK OFFICE
CERTIFICATE OF CORRECTION

PATENT NO. : 4,461,358
DATED : July 24, 1984
INVENTOR(S) : Howard L. Lewison

It is certified that error appears in the above-identified patent and that said Letters Patent are hereby corrected as shown below:

Column 2, line 13, Delete "9" and insert - 6 -

Signed and Sealed this

Eighteenth Day of December 1984

[SEAL]

Attest:

Attesting Officer

GERALD J. MOSSINGHOFF

Commissioner of Patents and Trademarks